United States Patent
Tanimura et al.

(10) Patent No.: US 9,553,674 B2
(45) Date of Patent: Jan. 24, 2017

(54) OPTICAL TRANSMITTER AND METHOD OF OPTICAL TRANSMISSION

(71) Applicant: FUJITSU LIMITED, Kawasaki-shi, Kanagawa (JP)

(72) Inventors: Takahito Tanimura, Kawasaki (JP); Takeshi Hoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/556,266

(22) Filed: Dec. 1, 2014

(65) Prior Publication Data

US 2015/0188637 A1 Jul. 2, 2015

(30) Foreign Application Priority Data

Dec. 26, 2013 (JP) .................................. 2013-269075

(51) Int. Cl.
*H04B 10/532* (2013.01)
*H04J 14/06* (2006.01)

(52) U.S. Cl.
CPC ............. *H04B 10/532* (2013.01); *H04J 14/06* (2013.01)

(58) Field of Classification Search
CPC .......... H04B 10/532; H04B 10/2569–10/2572; H04J 14/02; H04J 14/06
See application file for complete search history.

(56) References Cited

U.S. PATENT DOCUMENTS

| 7,271,948 B1 * | 9/2007 | Wang ................. H04B 10/2537 359/334 |
| 2005/0226633 A1 | 10/2005 | Liu |
| 2006/0127104 A1 | 6/2006 | Harley et al. |
| 2008/0166128 A1 * | 7/2008 | Toyomaki ............... H04J 14/02 398/79 |
| 2010/0111531 A1 | 5/2010 | Tanimura et al. |
| 2011/0170869 A1 * | 7/2011 | Mandai ................... H04J 14/06 398/65 |
| 2012/0315043 A1 | 12/2012 | Nakagawa et al. |

FOREIGN PATENT DOCUMENTS

| JP | 2010-109705 | 5/2010 |
| WO | 2011096488 | 8/2011 |

* cited by examiner

*Primary Examiner* — David Payne
*Assistant Examiner* — Casey Kretzer
(74) *Attorney, Agent, or Firm* — Fujitsu Patent Center

(57) ABSTRACT

An optical transmitter includes a circuit that controls a first frequency component and a second frequency component that are contained in an optical signal to be transmitted to be in different polarization states from each other.

14 Claims, 11 Drawing Sheets

OPTICAL TRANSMITTER AND METHOD OF OPTICAL TRANSMISSION

CROSS-REFERENCE TO RELATED APPLICATION

This application is based upon and claims the benefit of priority of the prior Japanese Patent application No. 2013-269075, filed on Dec. 26, 2013, the entire contents of which are incorporated herein by reference.

FIELD

The embodiment discussed herein is an optical transmitter and a method of optical transmission.

BACKGROUND

One of the known phenomena is a change in quality of an optical signal when being received at an optical receiver depending on a polarization state of the optical signal transmitted from an optical transmitter. This phenomenon is caused by, for example, Polarization-Mode Dispersion (PMD), Polarization Dependent Loss (PDL), Polarization Hole Burning (PHB), or Polarization dependent Gain (PDG).

This phenomenon may degrade the quality of an optical signal having a particular polarization state.

Considering the above, the optical transmitter described in Patent Literatures 1-4 performs polarization scrambling on an optical signal to be transmitted. The process of polarization scrambling modifies the polarization state of an optical signal each time a certain period elapses. The optical transmitter of Patent Literatures 1-4 pre-equalizes an optical signal to be transmitted. Pre-equalization is a technique of applying, to an optical signal to be transmitted in advance, a change of the reverse direction to a prospective change in the polarization state of an optical signal that would occur while the optical signal is being transmitted.

Patent Literature 1: United States Unexamined Patent Application Publication No. 2005/0226633
Patent Literature 2: WO 2011/096488
Patent Literature 3: Japanese Laid-Open Patent Publication No. 2010-109705
Patent Literature 4: United States Unexamined Patent Application Publication No. 2006/0127104

SUMMARY

As an aspect of an embodiment, an optical transmitters includes a circuit that controls a first frequency component and a second frequency component that are contained an optical signal to be transmitted to be in different polarization states from each other.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
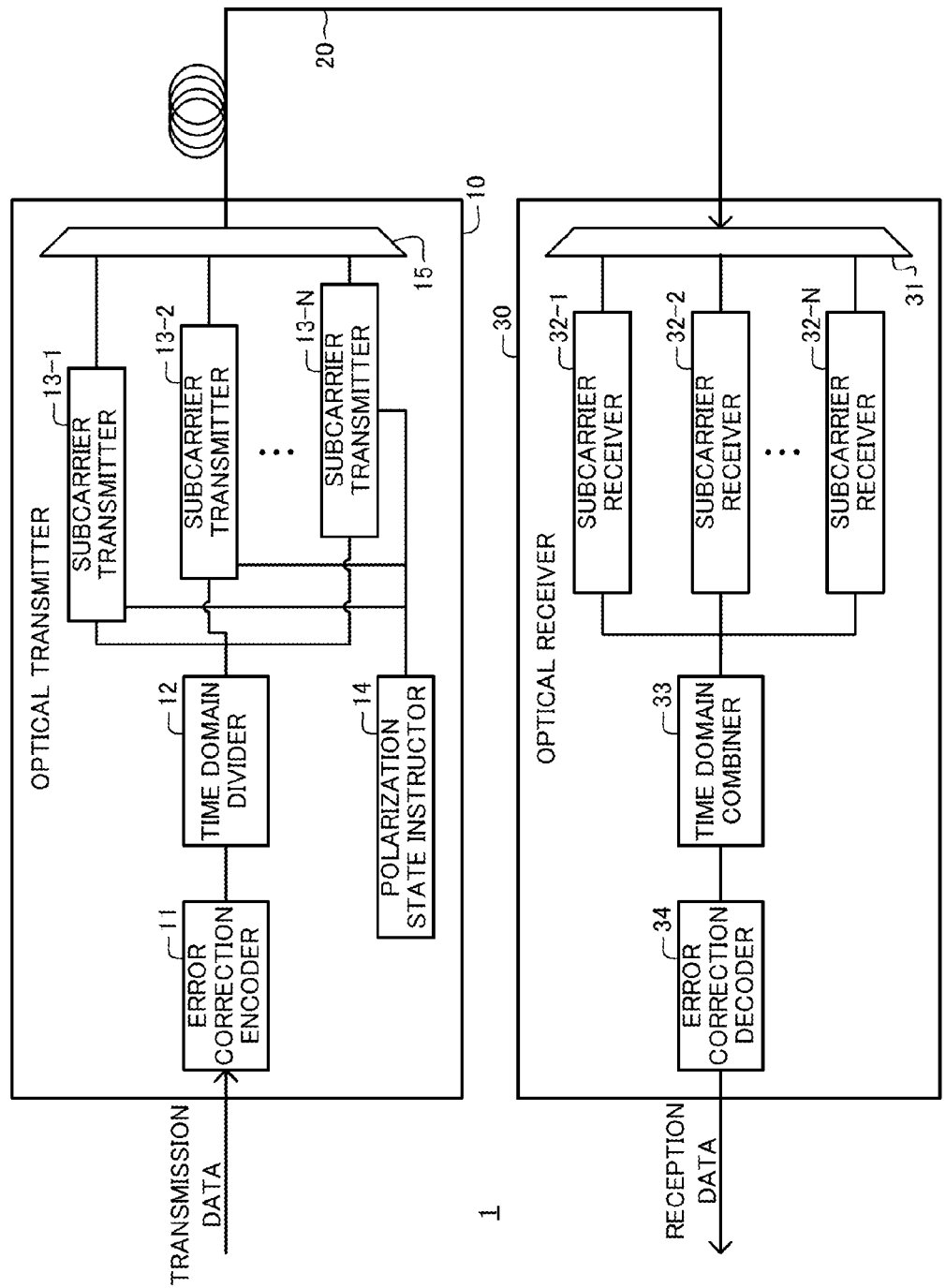
FIG. 1 is a block diagram schematically illustrating an example of the configuration of an optical communication system according to a first embodiment.

The relationship between the quality of an optical signal to be received and the polarization state of the optical signal to be transmitted changes depending on the heat and the stress applied to the transmission path of the optical signal. Hereinafter, this relationship is also referred to as a quality polarization property. The heat and the stress applied to the transmission path of an optical signal may change as time passes. This means that the quality polarization property also changes as time passes. For the above, in polarization scrambling, unless the polarization state of an optical signal is changed at intervals sufficiently shorter compared with the time cycle during which the quality polarization property changes, degrading of the quality of an optical signal to be received may not be satisfactorily avoided.

In polarization scrambling, an optical receiver that receives an optical signal detects the polarization state of the received optical signal and processes the received optical signal on the basis of the detected polarization state. A shorter cycle that changes the polarization state of an optical signal to be received due to the polarization scrambling more degrades the accuracy in detection of the polarization state. Accordingly, the cycle of changing the polarization state during polarization scrambling is not sometimes allowed to be satisfactorily shorter than a time cycle during which the quality polarization property changes, which may lower the transmission quality of the optical signal.

When pre-equalization is adopted, the optical receiver detects a change in the polarization state of an optical signal occurring during the transmission of the optical signal, and notifies the optical transmitter of the detected change in the polarization state. Accordingly, when the time for notification is not satisfactorily shorter compared with the time cycle during which the quality polarization property changes, it is difficult to accomplish pre-equalization corresponding to the actual change in the polarization state and consequently, the transmission quality of an optical signal may be degraded.

For this reason, the above optical transmitter has a possibility of degrading the transmission quality of an optical signal.

Hereinafter, an embodiment of the present disclosure will be described with reference to the accompanying drawings. The following embodiment is exemplary, so there is no intention to exclude application of various modifications and techniques not suggested in the following description to the embodiment. Throughout accompanying drawings of the embodiment, like reference numbers designate the same or substantially identical parts and elements.

<First Embodiment>
(Overview)

An optical transmitter according to a first embodiment includes a circuit that controls a first frequency component and a second frequency component that are contained in an optical signal to be transmitted to be in respective different polarization states.

This configuration allows the quality of the first frequency component and that of the second frequency component to change differently from each other, so that change in transmission quality of an optical signal can be mitigated. In other words, the transmission quality of an optical signal can be improved.

Hereinafter, an optical communication system of the first embodiment will now be detailed.

(Configuration)

As illustrated in FIG. 1, an optical communication system 1 of the first embodiment includes an optical transmitter 10 and an optical receiver 30. The optical transmitter 10 and the optical receiver 30 are connected to each other via a transmission path 20. The transmission path 20 of the first embodiment is an optical fiber. The optical communication system 1 may include a non-illustrated optical amplifier that amplifies an optical signal on the transmission path 20.

The optical communication system 1 exemplarily adopts Wavelength Division Multiplexing (WDM) to optical communication.

(Configuration: Optical Transmitter)

The optical transmitter 10 exemplarily includes an error correction encoder 11, a time domain divider 12, N subcarrier transmitters 13-1, 13-2, . . . , 13-N, a polarization state instructor 14, and a multiplexer 15. N is a natural number equal to or more than 2. Here, not having to be discriminated from one another, the respective subcarrier transmitter 13-$i$ is referred to as the subcarrier transmitter 13 where $i$ represents an integer of 1 through N.

The error correction encoder 11 attaches an error correction code to transmission data input into the optical transmitter 10. The transmission data is in the form of an electric signal. Examples of an error correction code are a block code and a convolutional code. The error correction encoder 11 outputs the transmission data attached thereto the error correction code to the time domain divider 12.

The time domain divider 12 divides the transmission data output from the error correction encoder 11 in the time domain. For example, the time domain divider 12 divides the transmission data into frames each having a certain time length. The pieces of the divided transmission data are also referred to as time-division transmission data pieces.

The time domain divider 12 distributes the time-division transmission data pieces to the N subcarrier transmitters 13-1, 13-2, . . . , 13-N. For example, the distribution may be comply with Round Robin.

N different wavelengths (in other words, N frequencies) are allocated to N subcarrier transmitters 13-1, 13-2, . . . , 13-N, respectively. The subcarrier transmitter 13-$i$ generates a subcarrier optical signal having a frequency band covering the frequency allocated to the subcarrier transmitter 13-$i$ using the time division transmission data piece distributed thereto by the time domain divider 12.

Figure 2:
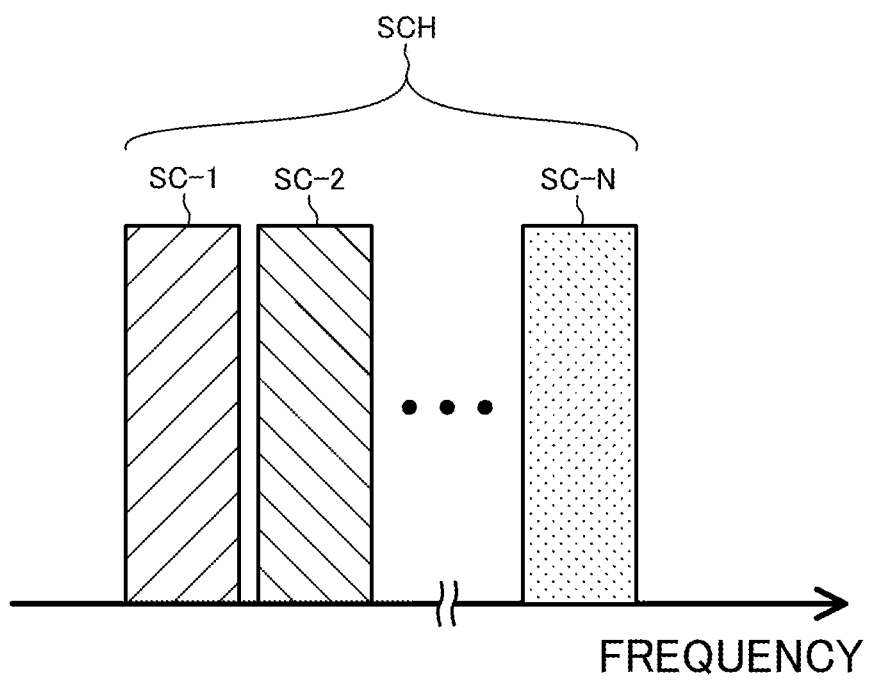
FIG. 2 is a diagram schematically illustrating an example of an optical signal transmitted from an optical transmitter of FIG. 1.

As illustrated in FIG. 2, the N subcarrier transmitters 13-1, 13-2, . . . , 13-N in the first embodiment generate N subcarrier optical signals SC-1, SC-2, . . . , SC-N having different frequency bands, respectively. In the first embodiment, the N subcarrier optical signals SC-1, SC-2, . . . , SC-N are collectively used as a single super channel SCH. For example, the super channel SCH may serve as a communication path established between an optical transmitter and a counterpart optical receiver. Alternatively, part of N subcarrier optical signals SC-1, SC-2, . . . , SC-N may be used as the super channel SCH.

Each subcarrier transmitter 13-$i$ outputs the generated subcarrier optical signal to the multiplexer 15. A subcarrier optical signal is an example of a frequency component contained in the optical signal to be transmitted from the multiplexer 15.

Each subcarrier transmitter 13-$i$ and the polarization state instructor 14 will be detailed below.

The multiplexer 15 multiplexes the N subcarrier optical signals output from the N subcarrier transmitters 13-1, 13-2, . . . , 13-N. The multiplexing of the subcarrier optical signals is also referred to as superimposing of the subcarrier optical signals. The multiplexer 15 transmits the optical signal obtained by the multiplexing to the optical receiver 30 via the transmission path 20. The optical signal transmitted by the multiplexer 15 is also referred to as transmission light.

The functions of the error correction encoder 11, the time domain divider 12, a digital signal processor 131 illustrated in FIG. 3 that is to be detailed below, and the polarization state instructor 14 each may be achieved by a Large Scale Integration (LSI) or a programmable logic circuit device, such as a Programmable Logic Device (PLD) or an Field-Programmable Gate Array (FPGA).

The optical transmitter 10 may include a processor and a memory in place of the error correction encoder 11, the time domain divider 12, the digital signal processor 131, and the polarization state instructor 14. With this configuration, the processor may execute a program recorded (i.e., stored) in the memory to thereby achieve the functions of the error correction encoder 11, the time domain divider 12, the digital signal processor 131, and the polarization state instructor 14. An example of the processor is a Digital Signal Processor (DSP).

(Configuration: Optical Receiver)

The optical receiver 30 illustrated in FIG. 1 exemplarily includes a demultiplexer 31, N subcarrier receivers 32-1, 32-2, . . . , 32-N, a time domain combiner 33, and an error correction decoder 34. Hereinafter, not having to be discriminated from one another, the subcarrier receiver 32-$i$ (where $i$ represents an integer of 1 through N) is referred to as the subcarrier receiver 32.

The demultiplexer 31 receives an optical signal transmitted from the optical transmitter 10 via the transmission path 20. The demultiplexer 31 demultiplexes the received optical signal by frequency band. N different wavelengths (in other words, frequencies) are allocated to the N subcarrier receivers 32-1, 32-2, . . . , 32-N, respectively. The pieces of the optical signal demultiplexed by frequency band are also referred to as subcarrier optical signals. The demultiplexer 31 outputs the subcarrier optical signals to respective subcarrier receivers 32-$i$ allocated thereto frequencies corresponding to the subcarrier optical signals.

Each subcarrier receiver 32-$i$ generates time-division reception data using a subcarrier optical signal output from the demultiplexer 31. The time-division reception data is in the form of an electric signal. The subcarrier receiver 32-$i$ outputs the generated time-division reception data to the time domain combiner 33.

The subcarrier receiver 32-$i$ will be detailed below.

The time domain combiner 33 combines N pieces of time-division reception data output from the N subcarrier receivers 32-1, 32-2, . . . , 32-N in the time domain. The combined pieces of the time-division reception data is also referred to as reception data. The time domain combiner 33 then outputs the reception data to the error correction decoder 34.

The error correction decoder 34 performs error correction on the reception data output from the time domain combiner 33. In the first embodiment, the error correction decoder 34 performs error correction based on an error correction code included in the reception data. After that, the error correction decoder 34 outputs the reception data after undergoing the error correction.

The functions of a digital signal processor 328 illustrated in FIG. 4 to be detailed below, the time domain combiner 33, and the error correction decoder 34 may be each achieved by an LSI, or a programmable logic circuit device, such as a PLD and an FPGA.

The optical receiver 30 may include a processor (e.g., a DSP) and a memory in place of the time domain combiner 33 and the error correction decoder 34. With this configuration, the processor may execute a program recorded (i.e., stored) in the memory to thereby achieve the functions of the time domain combiner 33 and the error correction decoder 34.

Next, the configuration of the subcarrier transmitter 13-$i$ will now be detailed.

Figure 3:
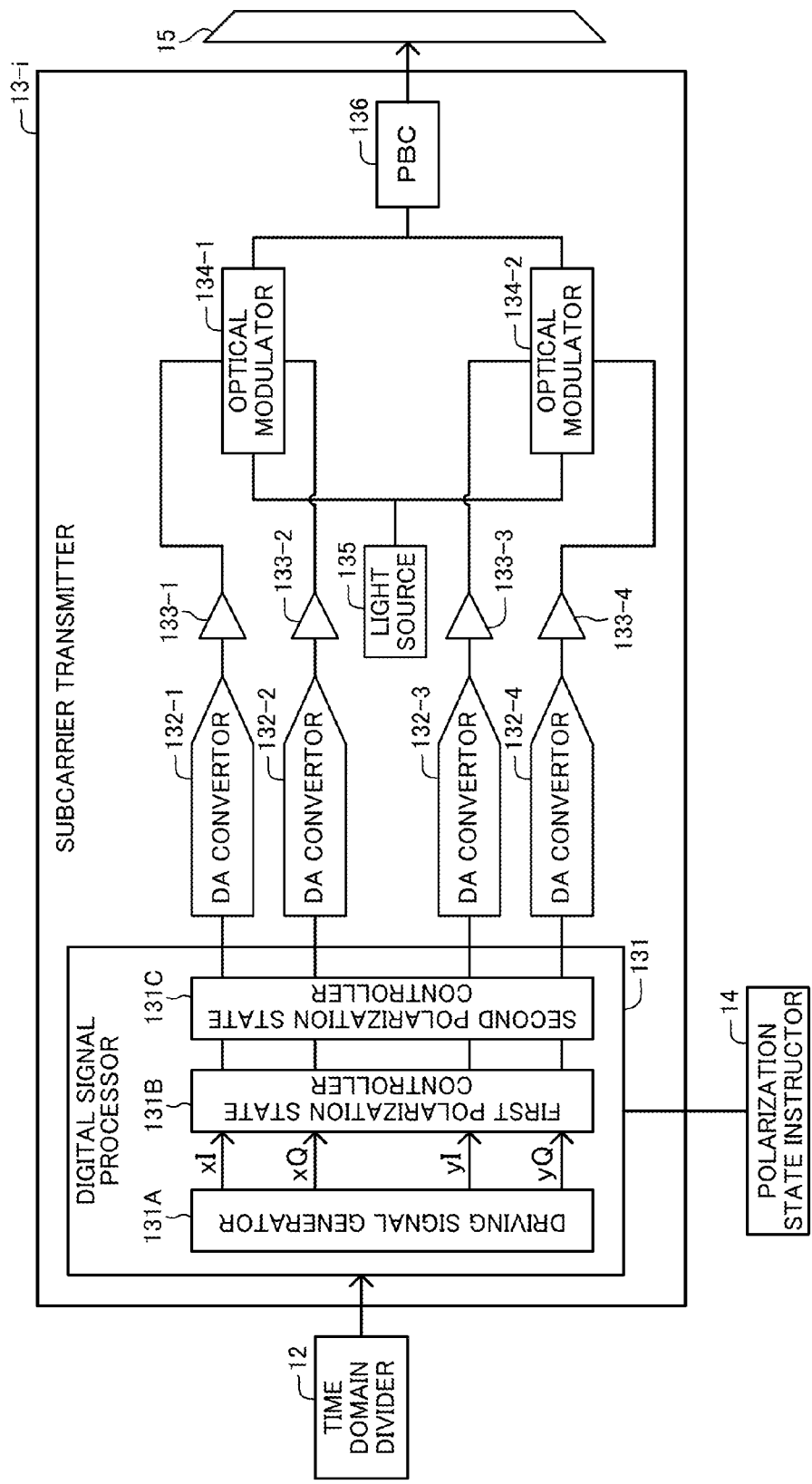
FIG. 3 is a block diagram schematically illustrating an example of the configuration of a subcarrier transmitter of FIG. 1.

As illustrated in FIG. 3, the subcarrier transmitter 13-$i$ exemplarily includes a digital signal processor 131, four DA (Digital to Analog) convertors 132-1, 132-2, 132-3, 132-4, four amplifiers 133-1, 133-2, 133-3, 133-4, two optical modulators 134-1, 134-2, a light source 135, and a PBC (Polarization Beam Combiner) 136. The optical modulators 134-1, 134-2 are examples of modulating circuits.

The digital signal processor 131 includes a driving signal generator 131A, a first polarization state controller 131B, and a second polarization state controller 131C.

The driving signal generator 131A generates first to fourth driving signals based on the time-division transmission data pieces output from the time domain divider 12. In the first embodiment, a data block, which is included in the time-division transmission data pieces and is represented by the first and second driving signals, is different from a data block, which is included in the time-division transmission data pieces and is represented by the third and fourth driving signals. Alternatively, the first and second driving signals may represent the same data block as the data block represented by the third and fourth driving signals.

In the first embodiment, the optical modulator 134-1 modulates laser light on the basis of the first and second driving signals generated by the driving signal generator 131A and thereby generates x polarized wave as will be detailed below. In the same manner, the optical modulator 134-2 modulates laser light on the basis of the third and fourth driving signals generated by the driving signal generator 131A and thereby generates y polarized wave. The x polarized wave is orthogonal to the y polarized wave.

In a case where the first polarization state controller 131B and the second polarization state controller 131C do not control the driving signals in the first embodiment, the x polarized wave and the y polarized wave respectively generated by the optical modulators 134-1 and 134-2 are both linearly-polarized waves. The x polarized wave in this case is also referred to as standard x polarized wave while the y polarized wave in this case is referred to as standard y polarized wave.

The driving signal generator 131A generates the first and second driving signals so that the optical modulator 134-1 performs modulation in a certain modulating scheme. Likewise, the driving signal generator 131A generates the third and fourth driving signals so that the optical modulator 134-2 performs modulation in the modulating scheme.

The first embodiment adopts Quadrature Amplitude Modulation (QAM) to the modulating scheme. Alternatively, the modulating scheme may be Amplitude Shift Keying (ASK) or Phase Shift Keying (PSK).

In the first embodiment, the modulation performed by the optical modulators 134-1 and 134-2 are referred to as IQ modulation or orthogonal modulation.

In the first embodiment, the first driving signal xI corresponds to the In-phase component (I component) of the x polarized wave while the second driving signal xQ corresponds to the Quadrature-phase component (Q component) of the x polarized wave. In the same manner, the third driving signal yI corresponds to the I component of the y polarized wave while the fourth driving signal yQ corresponds to the Q component of the y polarized wave.

The first polarization state controller 131B controls the first to fourth driving signals in accordance with a first polarization state instruction that the polarization state instructor 14 outputs as to be detailed below.

The first polarization state instruction of the first embodiment includes information to instruct change of the polarization state of a subcarrier optical signal. For example, a polarization state is expressed on the basis of a phase difference between a component of an electric field along the direction of a first axis on a plane orthogonal to the traveling direction of the light and a component of an electric filed along the direction of a second axis orthogonal to the first axis on the plane and a rotation angle of the first axis with respect to the transmission path 20. Alternatively, a polarization state may be expressed by three Stokes parameters.

The first polarization state controller 131B controls the first to fourth driving signals so that the x polarized wave and the y polarized wave respectively generated by the optical modulators 134-1, 134-2 come to be first controlled x polarized wave and first controlled y polarized wave, respectively. The first controlled x polarized wave and the first controlled y polarized wave are obtained by applying respective changes of the polarization states indicated by the first polarization state instruction to the standard x polarized wave and the standard y polarized wave over the entire frequency band that the corresponding subcarrier optical signal covers.

The first polarization state controller 131B outputs the controlled first to fourth driving signals to the second polarization state controller 131C. The first polarization state controller 131B may be referred to as a polarization rotating controller.

The second polarization state controller 131C controls the controlled first to fourth driving signals after undergoing the control by the first polarization state controller 131B in accordance with a second polarization state instruction that the polarization state instructor 14 outputs as to be detailed below.

The second polarization state instruction of the first embodiment includes information to instruct change of the polarization states of multiple partial frequency components contained in a subcarrier optical signal. The multiple partial frequency components have respective different partial frequency bands, which constitute the frequency band that the corresponding subcarrier optical signal has.

The second polarization state controller 131C controls the first to fourth driving signals so that the x polarized wave and the y polarized wave respectively generated by the optical modulators 134-1, 134-2 come to be second controlled x polarized wave and second controlled y polarized wave, respectively. The second controlled x polarized wave and the second controlled y polarized wave are obtained by applying respective changes in polarization states indicated by the second polarization state instruction to the respective partial frequency components of the first controlled x polarized wave and the first controlled y polarized wave over the entire partial frequency bands that the corresponding partial frequency components cover.

The second polarization state controller 131C outputs the first to fourth driving signals after being controlled to the DA convertors 132-1, 132-2, 132-3, 132-4, respectively. The second polarization state controller 131C may be referred to as PMD adder.

The DA convertors 132-1, 132-2, 132-3, 132-4 respectively convert the first to fourth driving signals output from the second polarization state controller 131C from digital signals to analog signals. The DA convertors 132-1, 132-2, 132-3, 132-4 output the first to fourth driving signals after undergoing the conversion to the amplifiers 133-1, 133-2, 133-3, 133-4, respectively.

The amplifiers 133-1, 133-2, 133-3, 133-4 amplify the first to fourth driving signals output from the DA convertor 132-1, 132-2, 132-3, 132-4, respectively.

The amplifiers 133-1 and 133-2 output the amplified first and second driving signals to optical modulator 134-1 while the amplifiers 133-3 and 133-4 output the amplified third and fourth driving signals to the optical modulator 134-2.

The light source 135 emits laser light. An example of the light source 135 is a semiconductor laser, such as a Distributed Feedback Laser (DFL) or Laser Diode (LD).

The optical modulator 134-1 modulates the laser light emitted from the light source 135 on the basis of the first and second driving signals output from the amplifiers 133-1 and 133-2. In the first embodiment, the optical modulator 134-1 generates the x polarized wave through IQ modulation on the laser light on the basis of the first and second driving signals.

As described above, the first and second driving signals are controlled so as to apply a polarization state different from polarization states of subcarrier optical signals generated by the remaining subcarrier transmitters 13-j (where, j represents integers of 1 to N except for i). Accordingly, the optical modulator 134-1 generates x polarized wave controlled to be in a polarization state different from those of subcarrier optical signals generated by the remaining subcarrier transmitters 13-j. The optical modulator 134-1 outputs the generated x polarized wave to the PBC 136.

Likewise, the optical modulator 134-2 modulates the laser light emitted from the light source 135 on the basis of the third and fourth driving signals output from the amplifiers 133-3 and 133-4. In the first embodiment, the optical modulator 134-2 generates the y polarized wave through IQ modulation on the laser light on the basis of the third and fourth driving signals.

The third and fourth driving signals are controlled so as to apply a polarization state different from polarization states of subcarrier optical signals generated by the remaining subcarrier transmitters 13-j. Accordingly, the optical modulator 134-2 generates y polarized wave controlled to be in a polarization state different from those of subcarrier optical signals generated by the remaining subcarrier transmitters 13-j. The optical modulator 134-2 outputs the generated y polarized wave to the PBC 136.

The PBC 136 combines the x polarized wave and the y polarized wave respectively output from the optical modulators 134-1, 134-2. The combining of the x polarized wave and the y polarized wave is also referred to as superimposing of the x polarized wave and the y polarized wave or polarization multiplexing. The PBC 136 outputs the optical signal obtained by the combining, serving as a subcarrier optical signal, to the multiplexer 15.

Next, the polarization state instructor 14 will now be detailed below.

The polarization state instructor 14 outputs N first polarization state instructions that instruct different changes of the polarization states to the N subcarrier transmitters 13-1, 13-2, . . . , 13-N, respectively.

In the first embodiment, the polarization state instructor 14 generates the first polarization state instructions such that 2N polarization points are in a certain first dispersion arrangement. The 2N polarization points are points representing the polarization states of the first controlled x polarized waves and the first controlled y polarized waves of the N subcarrier transmitters 13-1, 13-2, . . . , 13-N on a Poincaré sphere.

In the first embodiment, the polarization state instructor 14 determines the first dispersion arrangement such that the shortest distance expressed by the following expression 1 is maximized among arbitrary arrangements of the 2N polarization points on a Poincaré sphere. The shortest distance corresponds to the smallest value among the distances of all the possible combinations of two points from the 2N polarization points. For this purpose, the 2N polarization points are arranged so as to be uniformly dispersed on a Poincaré sphere. Here, $s_k$ represents a vector representing the k-th polarization point among the 2N polarization points; k is an integer of 1 to 2N; and m is an integer larger than k and is also equal to or less than 2N.

$$\min_{k<m}|s_k - s_m| \qquad \text{[Expression 1]}$$

Here, two points, which represent polarization states of two polarized waves orthogonal to each other on a Poincaré sphere, are arranged symmetric with respect to the center of the Poincaré sphere.

On the basis of the above, the polarization state instructor 14 determines the first dispersion arrangement under a condition that the following expression 2 is satisfied. Here, p is an integer of 1 to N. For example, $s_{2p-1}$ represents the polarization state of the first controlled x polarized wave generated in the subcarrier transmitter 13-p; and $s_{2p}$ represents the polarization state of the first controlled y polarized wave in the subcarrier transmitter 13-p.

$$s_{2p-1} = -s_{2p} \qquad \text{[Expression 2]}$$

As the above, the polarization state instructor 14 in the first embodiment generates first polarization state instructions such that the all the subcarrier optical signals contained in transmission light are controlled to be in respective different polarization states. Accordingly, the first polarization state controller 131B of the first embodiment is an example of a circuit that controls all the subcarrier optical signals contained in the transmission light to be in respective different polarization states.

Figure 5:
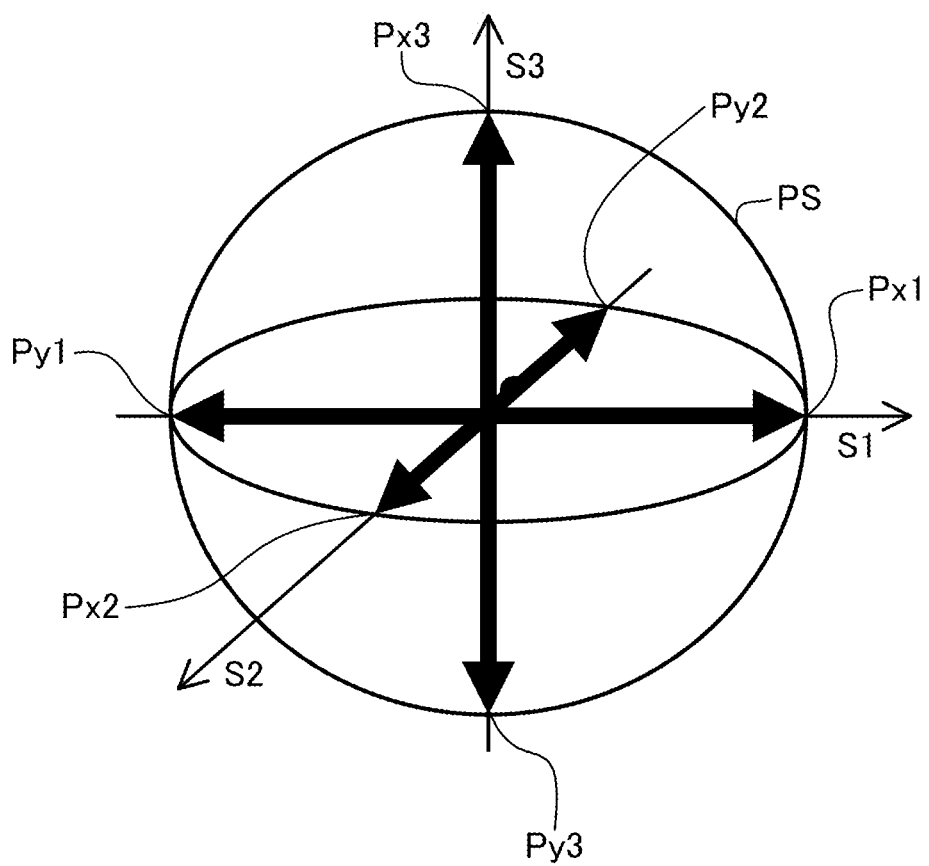
FIG. 5 is a diagram illustrating an example of arrangement of points representing polarization states applied by an optical transmitter of FIG. 1 on a Poincaré sphere.

When N=3, the points Px1, Px2, Px3, which represent the polarization states of the first controlled x polarized waves in the three subcarrier transmitters 13-1, 13-2, 13-3 on a Poincaré sphere PS, may be arranged as depicted in FIG. 5. In the first embodiment, the points Px1, Px2, Px3 are respectively arranged on three axes S1-S3 that are orthogonal to one another. Likewise, the points Py1, Py2, Py3, which represent the polarization states of the first controlled y polarized waves on a Poincaré sphere PS, are respectively arranged on the three axes S1-S3. In the first embodiment, the three axes S1-S3 represent three Stokes parameters, respectively. Alternatively, the three axes S1-S3 may be different from the three axes representing three Stokes parameters.

The shortest distance of the first dispersion arrangement determined by the polarization state instructor 14 may be less than the maximum value among arbitrary arrangements of the 2N polarization points on a Poincaré sphere. For example, the polarization state instructor 14 may repeat determination of a candidate for the first dispersion arrangement a certain number of times and determine a candidate having the shortest distance to be the maximum among the determined candidates as the first dispersion arrangement. Such a candidate for the first dispersion arrangement is determined by selecting the positions of the 2N polarization points using pseudo-random numbers. Alternatively, the polarization state instructor 14 may determine a candidate having a shortest distance that is equal to or more than a threshold to be the first dispersion arrangement among the determined candidates.

The polarization state instructor 14 may determine the first dispersion arrangement such that polarization states of part of N subcarrier optical signals coincides with the polarization state of at least one of the remaining subcarrier optical signals.

For example, the polarization state instructor 14 may restrict subcarrier optical signals that are to be controlled into respective different polarization states to subcarrier optical signals having a certain frequency band. For example, subcarrier optical signals having frequency bands at the both ends of the frequency band of the transmission light tends to more easily deteriorate than subcarrier optical signals having a frequency band at the center of the frequency band of the transmission light. For this reason, the polarization state instructor 14 can improve the transmission quality of the transmission light by the control that applies respective different polarization states to the subcarrier optical signals having frequency bands at the both ends of the frequency band of the transmission light.

Further alternatively, a subcarrier optical signal and a kind of data that the subcarrier optical signal carries may be associated with each other. In this case, the polarization state instructor 14 may restrict subcarrier optical signals that is to be controlled into respective different polarization states to subcarrier optical signals associated with a certain kind of data. In this case, quality of subcarrier optical signals that are to carry a kind of data having, for example, relatively higher importance can be improved.

Furthermore, the polarization state instructor 14 outputs N second polarization state instructions to the respective N subcarrier transmitters 13-1, 13-2, ..., 13-N.

Figure 6:
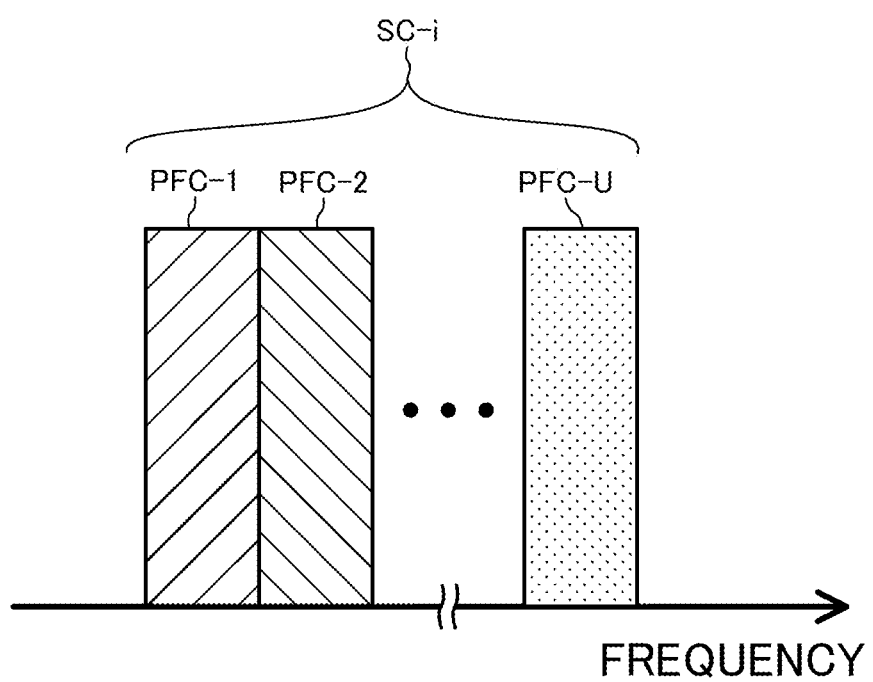
FIG. 6 is a diagram schematically illustrating an example of a subcarrier optical signal generated by a subcarrier transmitter of FIG. 3.
Figure 7:
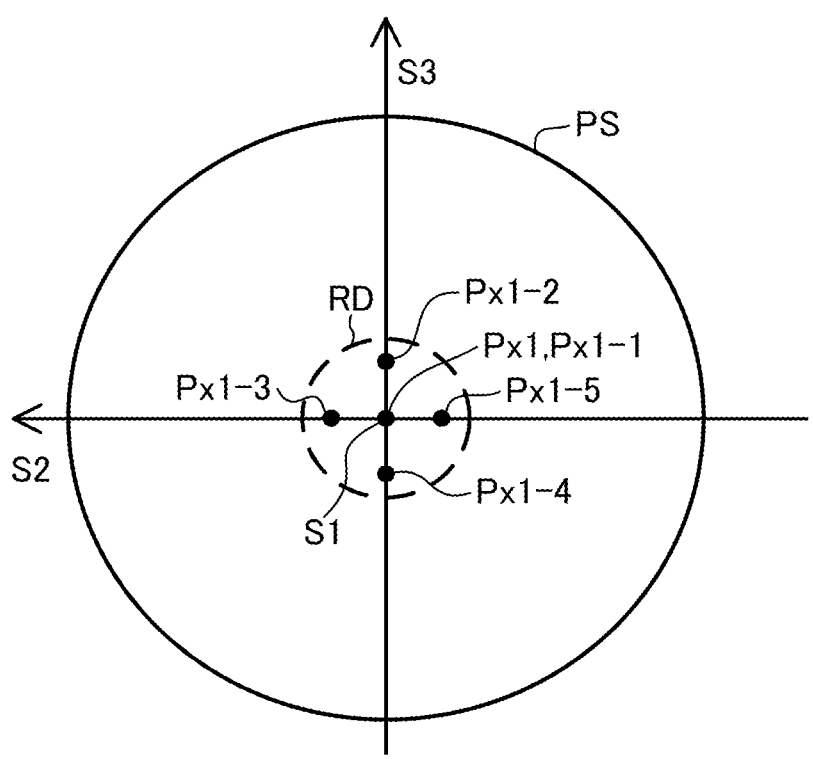
FIG. 7 is a diagram illustrating an example of arrangement of points representing polarization states applied by an optical transmitter of FIG. 1 on a Poincaré sphere.

As illustrated in FIG. 6, the first embodiment assumes that the subcarrier optical signal SC-i that the subcarrier transmitter 13-$i$ generates includes U partial frequency components PFC-1, PFC-2, ..., PFC-U. U is an integer equal to or more than two.

In the first embodiment, the polarization state instructor 14 generates the second polarization state instructions such that the 2U polarization points corresponding to each subcarrier optical signal are in a certain second dispersion arrangement. The 2U polarization points are points representing the polarization states of partial frequency components of the second controlled x polarized wave and the second controlled y polarized wave on a Poincaré sphere.

In the first embodiment, the polarization state instructor 14 determines the second dispersion arrangement such that U polarization points are arranged at respective different points in a dispersion region. A distance between any point in the dispersion region and a point representing the polarization state of the first controlled x polarized wave on a Poincaré sphere is equal to or less than an upper limit distance. The U polarization points represents the polarization states of the partial frequency components of the second controlled x polarized wave on a Poincaré sphere.

In a case of U=5, the U polarization points Px1-1 to Px1-5 are arranged in a dispersion region RD in which the distance between any point in the dispersion region RD and the point Px1 representing the polarization state of the first controlled x polarized wave on a Poincaré sphere is equal to or less than the upper limit distance.

In the first embodiment, the polarization state instructor 14 determines the second dispersion arrangement such that the polarization point of each partial frequency component of the second controlled y polarized wave is arranged symmetrically to the polarization point of the corresponding partial frequency component of the second controlled x polarized wave, which has the same partial frequency band as the partial frequency component of the second controlled y polarized wave, with respect to the center point of a Poincaré sphere.

As the above, the polarization state instructor 14 of the first embodiment generates each second polarization state instruction such that all the partial frequency components contained in a corresponding subcarrier optical signal are controlled to be in respective different polarization states. Accordingly, the second polarization state controller 131C of the first embodiment is an example of a circuit that controls all the partial frequency components contained in a subcarrier optical signal to be in respective different polarization states.

Alternatively, the polarization state instructor 14 may determine the second dispersion arrangement such that the polarization states of part of U partial frequency components coincide with the polarization state of at least one of the remaining partial frequency components.

Further alternatively, the polarization state instructor 14 may control part of the N subcarrier optical signals to have partial frequency components in respective different polarization states while may control the remaining subcarrier optical signals to have partial frequency components in the same polarization state.

Still further alternatively, the polarization state instructor 14 may restrict subcarrier optical signals each to be controlled to have partial frequency components in respective different states to subcarrier optical signals having a certain frequency band.

For example, a subcarrier optical signal and a kind of data that the subcarrier optical signal carries may be associated with each other. In this case, the polarization state instructor 14 may restrict subcarrier optical signals each having partial frequency components that are to be controlled into respective different polarization states to subcarrier optical signals associated with a certain kind of data.

Next, the detailed configuration of the subcarrier receiver 32-*i* will now be described.

Figure 4:
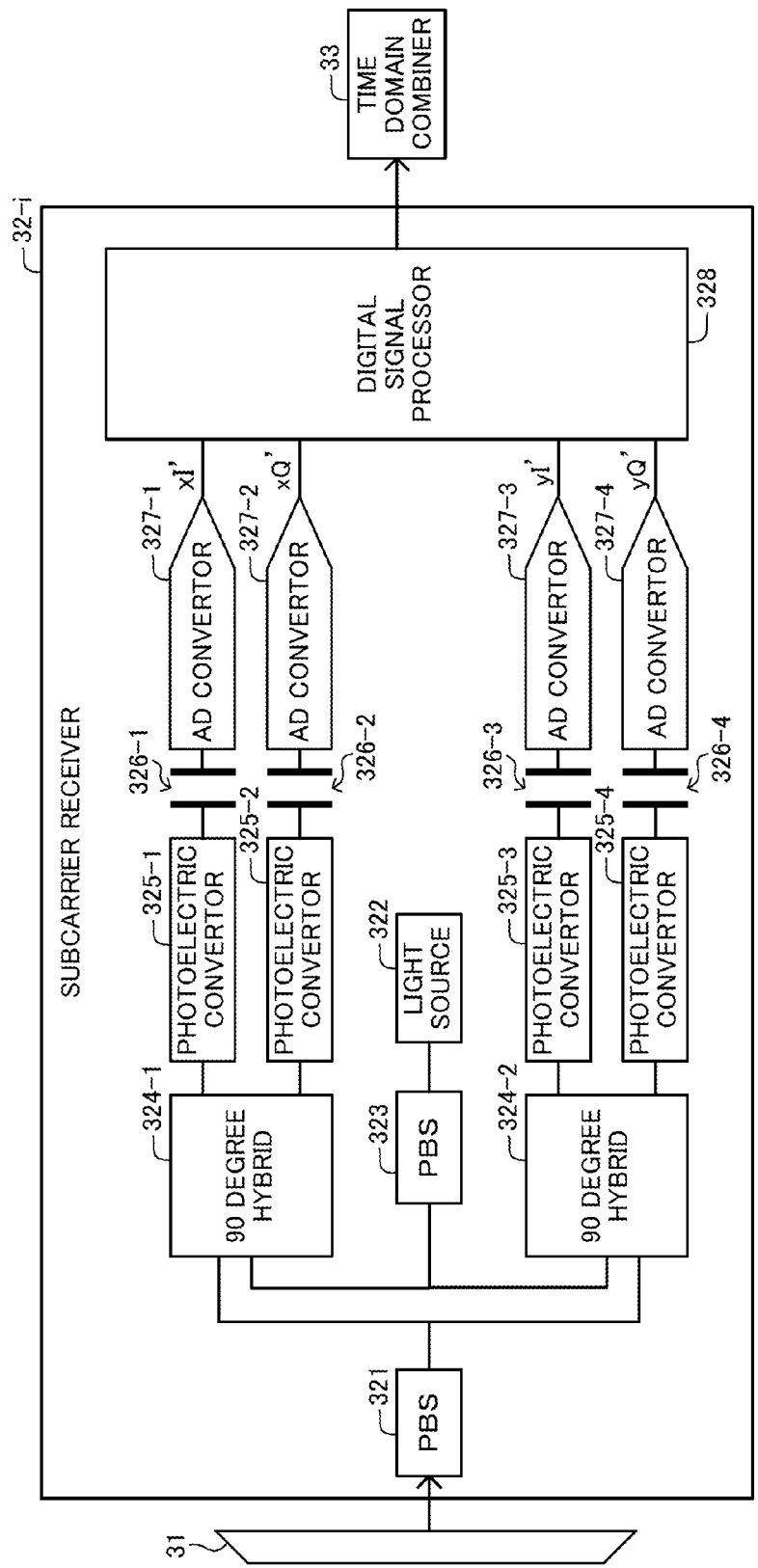
FIG. 4 is a block diagram schematically illustrating an example of the configuration of a subcarrier receiver of FIG. 1.

As illustrated in FIG. 4, the subcarrier receiver 32-*i* exemplarily includes a Polarizing Beam Splitter (PBS) 321, a light source 322, a PBS 323, two 90 degree hybrid 324-1, 324-2, and four photoelectric convertors 325-1, 325-2, 325-3, 325-4.

The subcarrier receiver 32-*i* further includes four AC combiner elements 326-1, 326-2, 326-3, 326-4, four AD convertors 327-1, 327-2, 327-3, 327-4, and the digital signal processor 328.

The PBS 321 splits a subcarrier optical signal output from the demultiplexer 31 into a first polarized wave and a second polarized wave, which are orthogonal to each other. The PBS 321 outputs the first polarized wave to the 90 degree hybrid 324-1 and outputs the second polarized wave to the 90 degree hybrid 324-2.

The light source 322 emits local oscillation light that is to be used for optical detection in the 90 degree hybrids 324-1, 324-2. An example of the light source 322 is a semiconductor laser such as a Distributed Feedback Laser, or a laser diode.

The PBS 323 splits the local oscillation light emitted from the light source 322 into third polarized wave and fourth polarized wave, which are orthogonal to each other. In the first embodiment, the first polarized wave and the third polarized wave are in the same polarization state while the second polarized wave and the fourth polarized wave are in the same polarization state. The PBS 323 outputs the third polarized wave to the 90 degree hybrid 324-1 and outputs the fourth polarized wave to the 90 degree hybrid 324-2.

The 90 degree hybrid 324-1 performs detection on the I component and the Q component of the first polarized wave output from the PBS 321 on the basis of the third polarized wave output from the PBS 323. Here, examples of manner of the detection is homodyne, heterodyne, and intradyne. Then the 90 degree hybrid 324-1 outputs first and second detected optical signals, serving as the result of the detection. In the first embodiment, the first detected optical signal xI' corresponds to the I component of the x polarized wave while the second detected optical signal xQ' corresponds to the Q component of the x polarized wave.

The 90 degree hybrid 324-2 performs detection on the I component and the Q component of the second polarized wave output from the PBS 321 on the basis of the fourth polarized wave output from the PBS 323. Then the 90 degree hybrid 324-2 outputs third and fourth detected optical signals, serving as the result of the detection. In the first embodiment, the third detected optical signal yI' corresponds to the I component of the y polarized wave while the fourth detected optical signal yQ' corresponds to the Q component of the y polarized wave.

The photoelectric convertors 325-1, 325-2, 325-3, 325-4 convert the first to fourth detected optical signals output from the 90 degree hybrids 324-1 and 324-2 from the optical signals to electric signals. Then the photoelectric convertors 325-1, 325-2, 325-3, 325-4 output the first to fourth detected optical signals after undergoing the conversion, as first to fourth detection data pieces, to the AD convertors 327-1, 327-2, 327-3, 327-4, respectively. The conversion from an optical signal to an electric signal is also referred to as photoelectric conversion.

The AD convertors 327-1, 327-2, 327-3, 327-4 receive the first to fourth detection data pieces output from the photoelectric convertors 325-1, 325-2, 325-3, 325-4, respectively. The photoelectric convertors 325-1, 325-2, 325-3, 325-4 are connected to the AD convertors 327-1, 327-2, 327-3, 327-4 via the AC combiner elements 326-1, 326-2, 326-3, 326-4, respectively. The AC combiner elements 326-1, 326-2, 326-3, 326-4 interrupt the direct-current components of electric signals. Examples of the AC combiner elements 326-1, 326-2, 326-3, 326-4 are capacitors.

The AD convertors 327-1, 327-2, 327-3, 327-4 convert the received first to fourth detection data pieces from analog signals to digital signals, and output the first to the fourth detection pieces after undergoing the conversion to the digital signal processor 328.

The digital signal processor 328 compensates for frequency offset, polarization mode dispersion, waveform distortion, and polarization state of the first to fourth detection data pieces output from the AD convertors 327-1, 327-2, 327-3, 327-4. Thereby, the polarization state having been controlled by the optical transmitter 10 and having been changed over the transmission path 20 can be compensated.

The digital signal processor 328 demodulates the compensated first to fourth detection data pieces in a demodulating scheme compatible with the modulating scheme used in the optical transmitter 10. The digital signal processor 328 outputs the demodulated data pieces, serving as time division reception data, to the time domain combiner 33.

(Operation)

Next, the operation of the optical communication system 1 will now be described.

In the first embodiment, the polarization state instructor 14 generates and outputs the first polarization state instructions and the second polarization state instructions when the optical transmitter 10 is started. The polarization state instructor 14 may generate and output the first polarization state instructions and the second polarization state instructions each time a certain time period elapses.

When transmission data is input into the optical transmitter 10, the error correction encoder 11 attaches an error correction code to the transmission data. Then, the time domain divider 12 divides the transmission data attached thereto the error correction code in the time domain. The time domain divider 12 distributes the time-division transmission data pieces to the N subcarrier transmitters 13-1, 13-2, . . . , 13-N.

The N subcarrier transmitters 13-1, 13-2, . . . , 13-N generate N subcarrier optical signals SC-1, SC-2, . . . , SC-N having different frequency bands, respectively. Here, description will now be made in relation to the detailed operation of the subcarrier transmitter 13-*i* (where, i is an integer of 1 through N).

The driving signal generator 131A generates first to fourth driving signals based on the time-division transmission data pieces output from the time domain divider 12. Then, the first polarization state controller 131B controls the first to fourth driving signals in accordance with the first polarization state instruction output by the polarization state instructor 14, and the second polarization state controller 131C further controls the first to fourth driving signals after being controlled in the first polarization state controller 131B in accordance with the second polarization state instruction output by the polarization state instructor 14.

The DA convertors 132-1, 132-2, 132-3, 132-4 convert the first to fourth driving signals after undergoing the control of the second polarization state controller 131C from digital signals to analog signals. Next, the amplifiers 133-1, 133-2, 133-3, 133-4 amplify the first to fourth driving signals after the conversion, respectively.

Next, the optical modulator 134-1 generates x polarized wave by modulating laser light emitted from the light source 135 on the basis of the first and second driving signals output from the amplifiers 133-1 and 133-2. Here, the polarization state of the generated x polarized wave is different from the polarization state of x polarized wave generated by each of the other subcarrier transmitters 13-*j* (where j is an integer from one to N except for i). In addition, the polarization states of the partial frequency components constituting the generated x polarized wave are different from one another.

Likewise, the optical modulator 134-2 generates y polarized wave by modulating the laser light emitted from the light source 135 on the basis of the third and fourth driving signals output from the amplifiers 133-3 and 133-4. Here, the polarization state of the generated y polarized wave is different from the polarization state of y polarized wave generated by each of the other subcarrier transmitters 13-*j* (where j is an integer from one to N except for i). In addition, the polarization states of the partial frequency components constituting the generated y polarized wave are different from one another.

The PBC 136 combines the x polarized wave and the y polarized wave output from the optical modulators 134-1, 134-2, and outputs the optical signal obtained by the combining, serving as a subcarrier optical signal, to the multiplexer 15. The multiplexer 15 multiplexes the N subcarrier optical signals output from the N subcarrier transmitters 13-1, 13-2, . . . , 13-N, and outputs the optical signal obtained by the multiplexing to the optical receiver 30 via the transmission path 20.

The optical receiver 30 receives the optical signal transmitted from the optical transmitter 10 via the transmission path 20. The demultiplexer 31 demultiplexes the received optical signal by frequency band and then outputs N subcarrier optical signals obtained by the demultiplexing to the N subcarrier receivers 32-1, 32-2, . . . , 32-N, respectively.

The N subcarrier receivers 32-1, 32-2, . . . , 32-N generate time-division reception data using the subcarrier optical signals. Here, the description will now be made in relation to the detailed operation of the subcarrier receiver 32-*i* (where, i is an integer of one to N).

First of all, the PBS 321 splits a subcarrier optical signal output from the demultiplexer 31 into a first polarized wave and a second polarized wave, which are orthogonal to each other while the PBS 323 splits local oscillation light emitted from the light source 322 into third polarized wave and fourth polarized wave, which are orthogonal to each other.

The 90 degree hybrid 324-1 performs detection on the I component and the Q component of the first polarized wave after undergoing the splitting of the PBS 321 on the basis of the third polarized wave after undergoing the splitting of the PBS 323. Likewise, the 90 degree hybrid 324-2 performs detection on the I component and the Q component of the second polarized wave after undergoing the splitting of the PBS 321 on the basis of the fourth polarized wave after undergoing the splitting of the PBS 323.

The photoelectric convertors 325-1, 325-2, 325-3, 325-4 convert the first to fourth detected optical signals after undergoing the detection in the 90 degree hybrids 324-1 and 324-2 from optical signals to electric signals. Then the AD convertors 327-1, 327-2, 327-3, 327-4 receive the first to fourth detection data pieces after undergoing the conversion by the photoelectric convertors 325-1, 325-2, 325-3, 325-4, respectively.

The AD convertors 327-1, 327-2, 327-3, 327-4 convert the received first to fourth detection data pieces from analog signals to digital signals, respectively. Then the digital signal processor 328 compensates for frequency offset, polarization mode dispersion, waveform distortion, and polarization state of the first to fourth detection data pieces after undergoing the conversion of the AD convertors 327-1, 327-2, 327-3, 327-4. After that, the digital signal processor 328 demodulates the compensated first to fourth detection data pieces in a demodulating scheme compatible with the modulating scheme used in the optical transmitter 10.

After that, the time domain combiner 33 combines demodulated time-division reception data output from the N subcarrier receivers 32-1, 32-2, . . . , 32-N in the time domain. The error correction decoder 34 performs error correction on the combined reception data output from the time domain combiner 33, and outputs the reception data after undergoing the error correction.

As described above, the optical transmitter 10 of the first embodiment controls the first and second subcarrier optical signals contained in the transmission light to be in respective different polarization states.

This can change the quality of the first subcarrier optical signal differently from the change of the quality of the second subcarrier optical signal, so that a change in transmission quality of the optical signal can be suppressed. In other words, the transmission quality of the optical signal can be improved.

Furthermore, the optical transmitter 10 of the first embodiment controls all the subcarrier optical signals contained in the transmission light to be in respective different polarization states.

This can enhance the possibility of suppressing a change in transmission quality of an optical signal.

Figure 8:
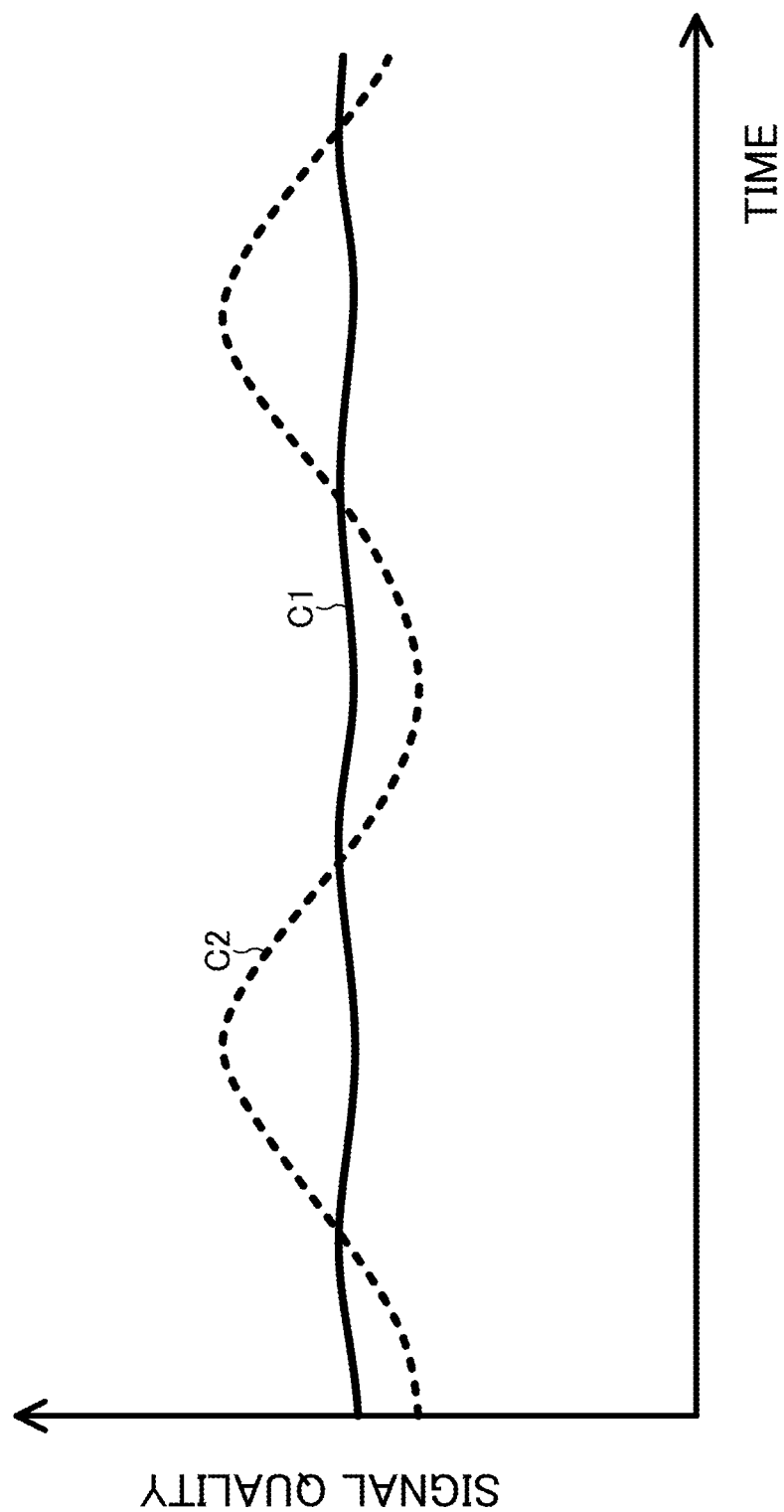
FIG. 8 is a graph depicting an example of a temporal change of reception quality of an optical signal.

For example, as depicted in FIG. 8, the signal quality representing the reception quality of the optical signal transmitted from the optical transmitter 10 of the first embodiment has a temporal change expressed by a solid curve C1. In the first embodiment, a higher value represents higher signal quality. For example, the signal quality increases in accordance with reduction of Bit Error Rate (BER). The signal quality may be represented by, for example, a Q (Quality) factor.

In contrast, when multiple subcarrier optical signals are not controlled to be in respective different polarization states, the resultant signal quality has a temporal change expressed by a dashed curve C2. This means that controlling multiple subcarrier optical signals to be in different polarization states can suppress a change in signal quality.

In addition, the optical transmitter 10 of the first embodiment controls the polarization states such that the points representing the polarization states of the first and second subcarrier optical signals have a certain arrangement on a Poincaré sphere.

This reduce the similarity between quality change in the first subcarrier optical signal and that in the second subcarrier optical signal, so that change in transmission quality of an optical signal can be suppressed.

Further, the optical transmitter 10 of the first embodiment controls the polarization states such that the shortest distance between two from multiple polarization points arranged on a Poincaré sphere is maximized among arbitrary possible arrangements. Here, the multiple polarization points represent the polarization states of the respective subcarrier optical signals contained in the transmission light on a Poincaré sphere. The shortest distance corresponds to the smallest value representing the distance between two polarization points among all the combination of two points from the multiple polarization points.

This reduces the similarity in quality change in the multiple subcarrier optical signals, so that a change in transmission quality of an optical signal can be suppressed.

Besides, the optical transmitter 10 of the first embodiment controls the first and second partial frequency components contained in a subcarrier optical signal to be in respective different polarization states.

This can change the quality of the first partial frequency component in a subcarrier optical signal differently from the change of the quality of the second partial frequency component in the subcarrier optical signal, so that a change in transmission quality of the subcarrier optical signal can be suppressed. In other words, the transmission quality of the optical signal can be improved.

The optical transmitter 10 may use the preset first polarization state instructions without modifying the instructions. This means that the first polarization state controller 131B may retain the first polarization state instructions in advance. Likewise, the optical transmitter 10 may use the preset second polarization state instructions without modifying the instructions. In this case, the second polarization state controller 131C may retain the second polarization state instructions in advance. In a case where the digital signal processor 131 retains the first and second polarization state instructions in advance, the polarization state instructor 14 can be omitted.

The polarization state instructor 14 may change one or both of the first polarization state instructions and the second polarization state instructions. For example, when the quality of a received optical signal in the optical receiver 30 is equal to or smaller than a first threshold, the optical transmitter 10 may carry out the first and second controls; when the quality of the received optical signal is larger than a second threshold, which is larger than the first threshold, the optical transmitter 10 may omit carrying out the first and second controls; and when the quality of the received optical signal is larger than the first threshold but is equal to or smaller than the second threshold signal, the optical transmitter 10 may carry out either one of the first and second controls. Here, the first control controls the polarization states of the subcarrier optical signals to be in respective different states while the second control controls the polarization states of partial frequency components to be in respective different states. Alternatively, the first control may apply respective different polarization states to the subcarrier optical signals while the second control may apply respective different polarization states to partial frequency components.

The optical transmitter 10 may omit carrying out the second control. In this case, the second polarization state controller 131C may be omitted.

The optical transmitter 10 may include a single subcarrier transmitter, which makes it possible to omit the first polarization state controller 131B.

Figure 9:
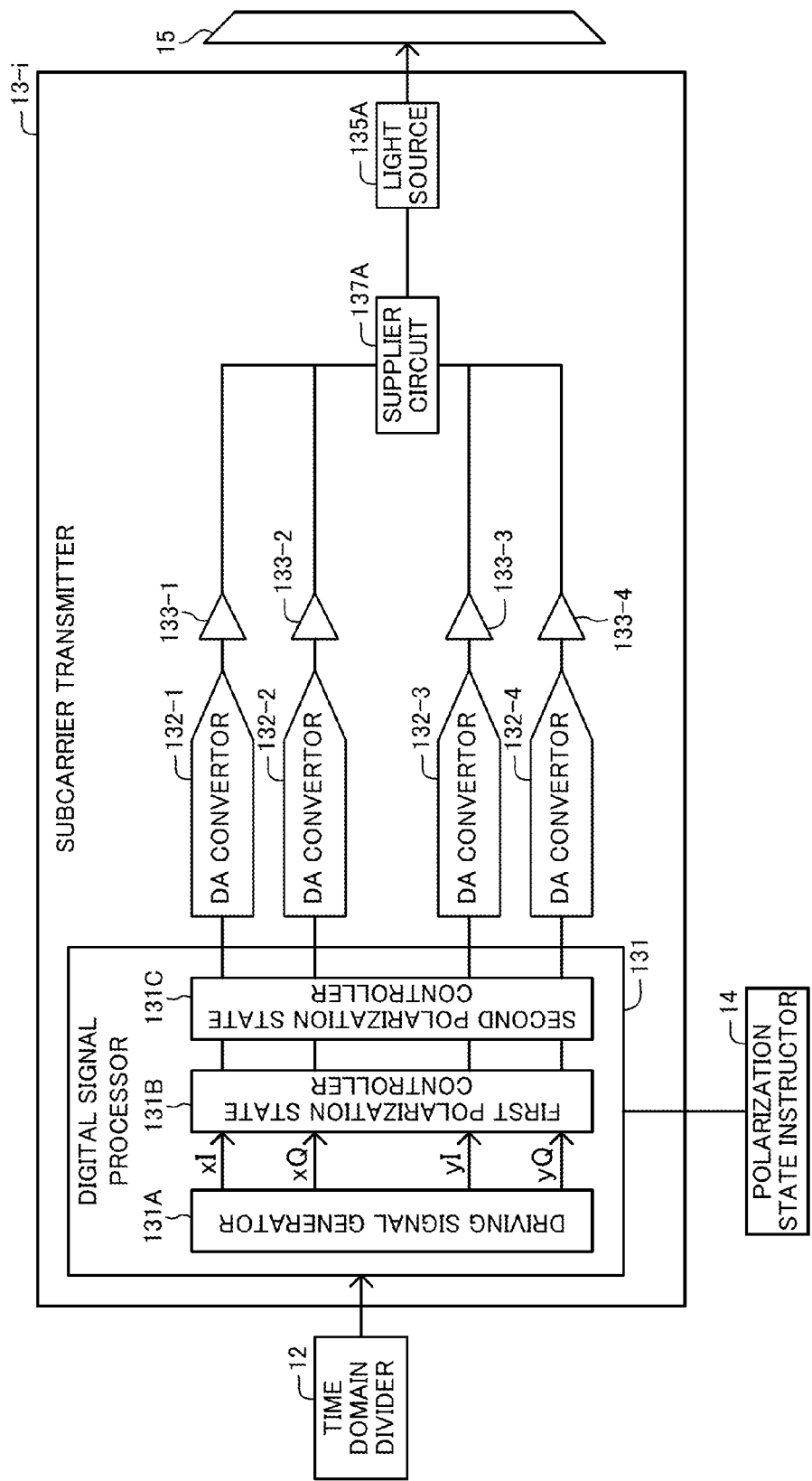
FIG. 9 is a block diagram schematically illustrating an example of the configuration of a subcarrier transmitter according to a modification.

The optical transmitter 10 of the first embodiment adopts external modulation, but may alternatively adopt direct modulation. In this case, the subcarrier transmitter 13-i includes, as illustrated in FIG. 9, a light source 135A and a supplier circuit 137A in place of the optical modulators 134-1, 134-2, the light source 135, and the PBC 136. The light source 135A generates a subcarrier optical signal modulated on the basis of the driving signals, and the supplier circuit 137A supplies the light source 135A with the driving signals. Furthermore, the digital signal processor 131 controls the polarization states through controlling the driving signals that the supplier circuit 137A supplies to the light source 135A.

The optical transmitter 10 of the first embodiment carries out polarization multiplexing, but may alternatively not carry out polarization multiplexing. In this case, the subcarrier transmitters 13-1, 13-2, . . . , 13-N may each output either one of the x polarized wave and the y polarized wave as a subcarrier optical signal, which makes it possible to omit the circuit that generates the other one of the x polarized wave and the y polarized wave.

In this case, the polarization state instructor 14 generates the first polarization state instructions such that N polarization points are in the certain first dispersion arrangement. Here, the N polarization points correspond to the points representing the polarization states of the first controlled x polarized waves or the first controlled y polarized waves generated in the respective subcarrier transmitters 13-1, 13-2, . . . , 13-N on a Poincaré sphere.

In this alternative example, the polarization state instructor 14 determines the first dispersion arrangement such that the shortest distance expressed by the following expression 3 is maximized among arbitrary arrangements of the N polarization points on a Poincaré sphere. The shortest distance is the smallest value among the distances of all the possible combinations of two polarization points from the N polarization points. For example, the N polarization points are arranged so as to be uniformly dispersed on a Poincaré sphere. Here, $s_k$ represents a vector representing the k-th polarization point among the N polarization points; k is an integer of 1 to N; and m is an integer larger than k and is also equal to or less than N.

$$\min_{k<m}|s_k - s_m| \qquad \text{[Expression 3]}$$

Figure 10:
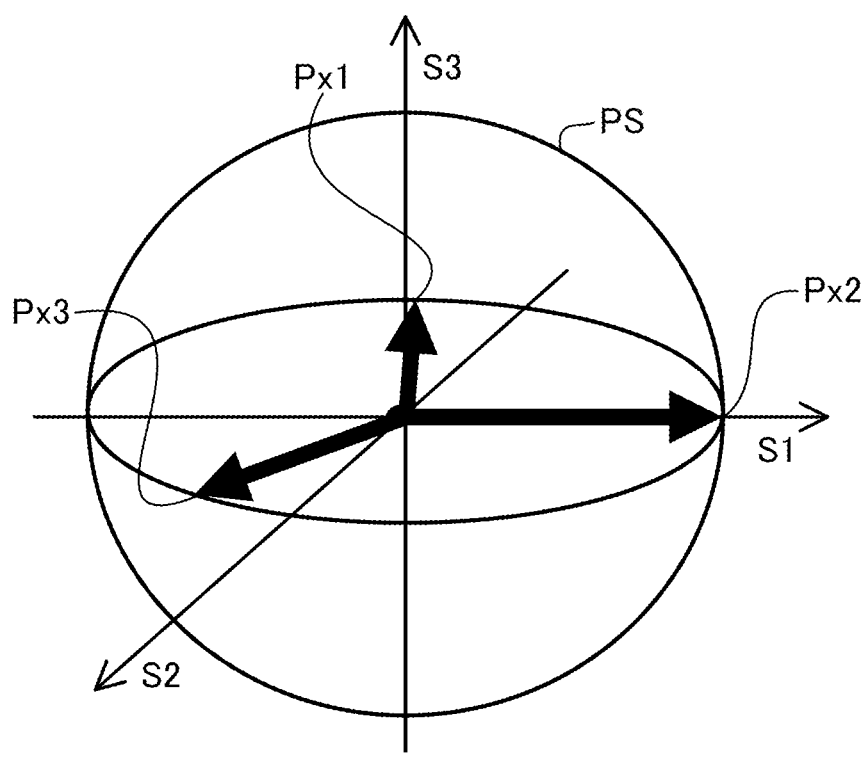
FIG. 10 is a diagram illustrating an example of arrangement of points representing polarization states applied by an optical transmitter of the modification on a Poincaré sphere.

For example, when N=3, the points Px1, Px2, Px3 representing the polarization states of the first controlled x polarized waves in the three subcarrier transmitters 13-1, 13-2, 13-3 may be arranged on a Poincaré sphere PS as depicted in FIG. 10. In this alternative example, the points Px1, Px2, Px3 are arranged on the vertices of an equilateral triangle which is inscribed in the surface of a Poincaré sphere PS and which is arranged on a plane including the center of the Poincaré sphere PS.

Figure 11:
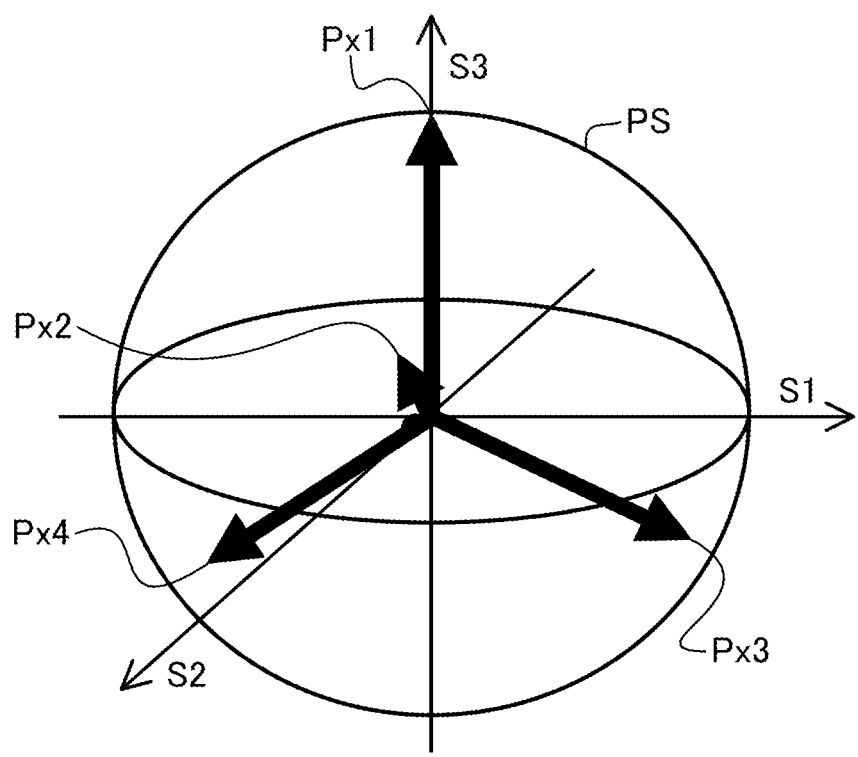
FIG. 11 is a diagram illustrating another example of arrangement of points representing polarization states applied by an optical transmitter of the modification on a Poincaré sphere.

When N=4, points Px1, Px2, Px3, Px4 representing the polarization states of the first controlled x polarized waves in the four subcarrier transmitters 13-1, 13-2, 13-3, 13-4 may be arranged on a Poincaré sphere PS as depicted in FIG. 11. In this case, the points Px1, Px2, Px3, Px4 may be arranged on the vertices of a regular tetrahedron which is inscribed in the surface of a Poincaré sphere PS.

According to the above disclosure, the transmission quality of an optical signal can be improved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising a circuit that controls a plurality of polarization states of a plurality of frequency components contained in an optical signal to be transmitted such that a plurality of points representing the plurality of polarization states on a Poincaré sphere are arranged so as to be uniformly dispersed on the Poincaré sphere and such that a minimum value of a distance between two of the plurality of points among distances for all combinations of two points of the plurality of points is maximized among arbitrary arrangement of the plurality of points on the Poincaré sphere.

2. The optical transmitter according to claim 1, wherein the circuit controls all of the plurality of frequency components to be in different polarization states from one another.

3. The optical transmitter according to claim 1, wherein the plurality of the frequency components, including first and second frequency components, have respective different frequency bands.

4. The optical transmitter according to claim 3, wherein the circuit controls a first partial frequency component and a second partial frequency component that are contained in one of the first frequency component and the second frequency component to be in different polarization states from each other.

5. The optical transmitter according to claim 1, further comprising:
a light source that generates one of the plurality of frequency components modulated on the basis of a driving signal; and
a supplier circuit that supplies the light source with the driving signal, wherein the circuit controls one of the plurality of polarization states through controlling the driving signal.

6. The optical transmitter according to claim 1, further comprising:
a light source that generates laser light having a frequency that one of the plurality of frequency components has;
a modulating circuit that modulates the laser light generated by the light source on the basis of a driving signal to generate the one of the plurality of frequency components, wherein
the circuit controls one of the plurality of polarization states through controlling the driving signal.

7. A method of optical transmission comprising controlling a plurality of polarization states of a plurality of frequency components contained in an optical signal to be transmitted such that a plurality of points representing the plurality of polarization states on a Poincaré sphere are arranged so as to be uniformly dispersed on the Poincaré sphere and such that a minimum value of a distance between two of the plurality of points among distances for all combinations of two points of the plurality of points is maximized among arbitrary arrangement of the plurality of points on the Poincaré sphere.

8. The method according to claim 7, further comprising controlling all of the plurality of frequency components to be in different polarization states from one another.

9. The method according to claim 7, wherein the plurality of the frequency components, including first and second frequency components, have respective different frequency bands.

10. The method according to claim 9, further comprising controlling a first partial frequency component and a second partial frequency component that are contained in one of the first frequency component and the second frequency component to be in different polarization states from each other.

11. The method according to claim 7, wherein the plurality of polarization states are controlled through controlling a driving signal, the driving signal being supplied to a light source that is to generate one of the plurality of frequency components modulated on the basis of the driving signal.

12. The method according to claim 7, wherein the plurality of polarization states are controlled through controlling a driving signal, the driving signal being supplied to a modulating circuit that modulates laser light being generated by a light source and having a frequency that one of the plurality of frequency components has on the basis of the driving signal to generate the one of the plurality of frequency components.

13. An optical transmitter comprising
a circuit that
controls a plurality of polarization states of a plurality of frequency components contained in an optical signal to be transmitted such that a plurality of points representing the plurality of polarization states on a Poincaré sphere are arranged so as to be uniformly dispersed on the Poincaré sphere, the plurality of the frequency components including first and second frequency components and having respective different frequency bands, and
controls a first partial frequency component and a second partial frequency component that are contained in one of the first frequency component and the second frequency component to be in different polarization states from each other.

14. A method of optical transmission comprising:
controlling a plurality of polarization states of a plurality of frequency components contained in an optical signal to be transmitted such that a plurality of points representing the plurality of polarization states on a Poincaré sphere are arranged so as to be uniformly dispersed on the Poincaré sphere, the plurality of the frequency components including first and second frequency components and having respective different frequency bands; and
controlling a first partial frequency component and a second partial frequency component that are contained in one of the first frequency component and the second frequency component to be in different polarization states from each other.

* * * * *